(12) United States Patent
Zhang et al.

(10) Patent No.: US 6,757,457 B1
(45) Date of Patent: Jun. 29, 2004

(54) CLASS OF CHARGE-ACTUATED CHROMOGENIC STRUCTURES BASED ON THE OXIDATION AND REDUCTION OF OPTICAL SWITCHABLE MATERIALS IN A THIN-FILM ELECTROCHEMICAL CELL

(75) Inventors: Xiao-An Zhang, Sunnyvale, CA (US); R. Stanley Williams, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 10/097,665

(22) Filed: Mar. 11, 2002

(51) Int. Cl.$^7$ .............................. G02B 6/35; G02B 6/26
(52) U.S. Cl. ........................... 385/16; 385/18; 385/147
(58) Field of Search .............................. 385/15–18, 147

(56) References Cited

U.S. PATENT DOCUMENTS 5,970,187 A * 10/1999 Notten et al. ................ 385/16

2002/0044717 A1 * 4/2002 Richardson .................. 385/16

OTHER PUBLICATIONS

Agnihotry, S. A. "Electrochromic Devices: Present and Forthcoming Technology," From "Bulletin of Electrochemistry", No. 12, Nov.–Dec. 1996, pp. 707–712.

Mortimer, Roger J. "Electrochromic Materials." From "Chemical Society Reviews", 1997, vol. 26, pp. 147–156.

Greenburg, Charles B. "Optically switchable thin films: a review," From Elsevier Science S.A. SSDI 0040–6090 (94) 06203–W. 1994, pp. 81–93.

* cited by examiner

Primary Examiner—Brian Healey
Assistant Examiner—Kevin S Wood

(57) ABSTRACT

An electrochemically-activated optical switch is provided, comprising a molecular system configured between a pair of electrodes. The molecular system includes a moiety that is oxidizable or reducible in the presence of an electric current.

7 Claims, 2 Drawing Sheets

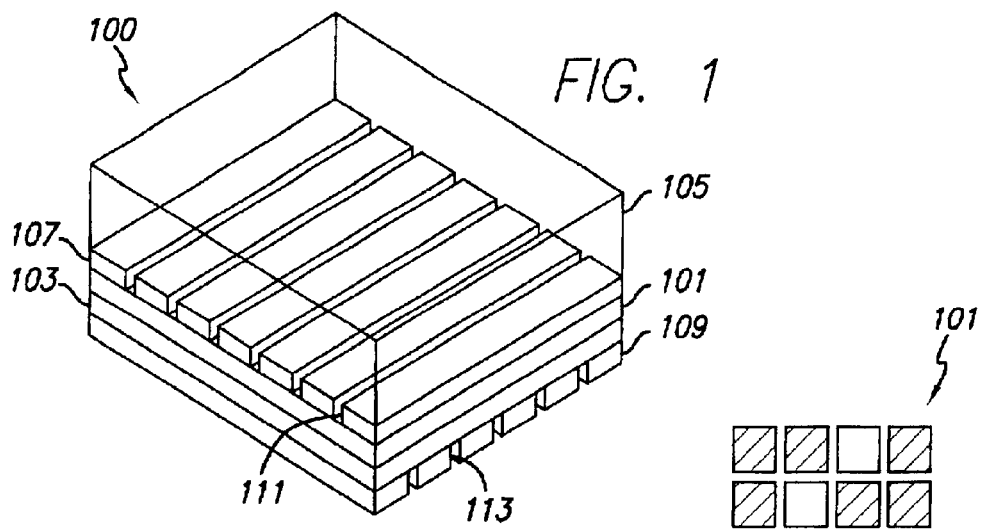
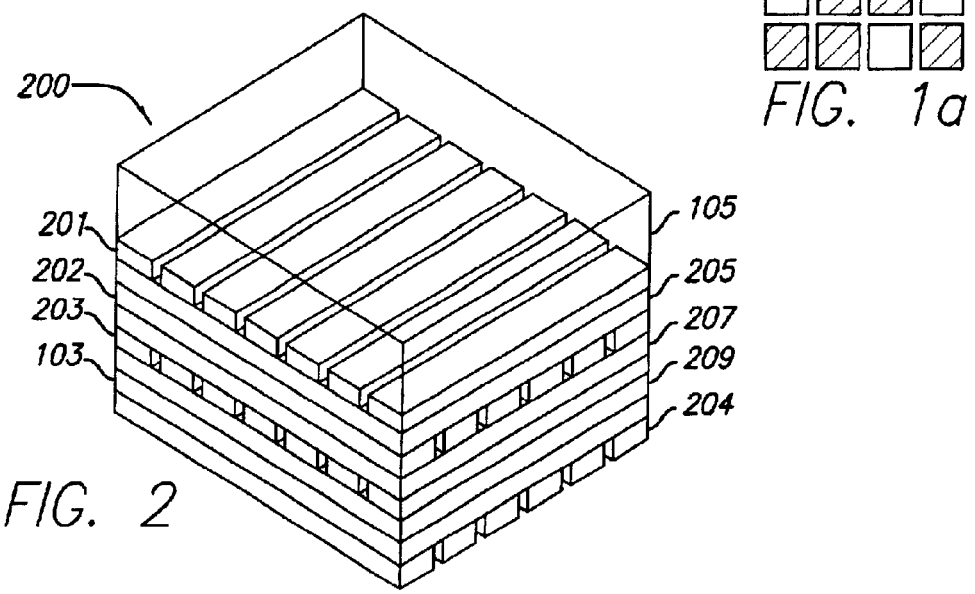
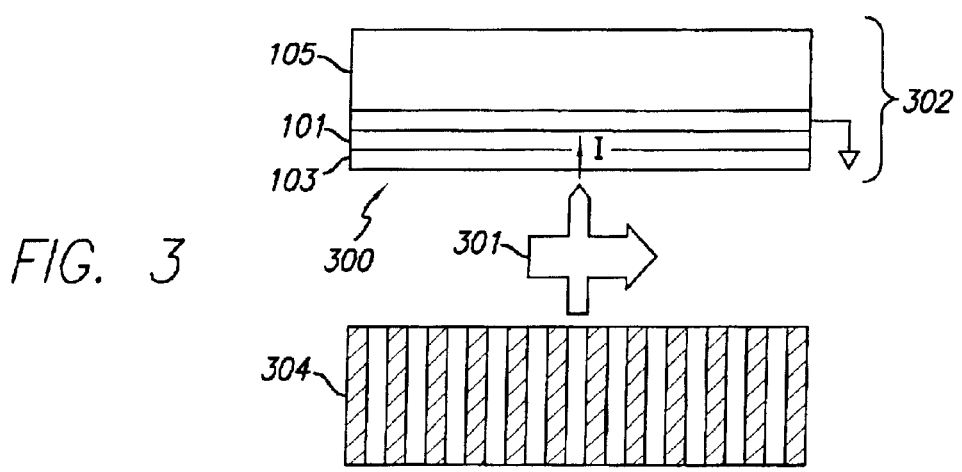

CLASS OF CHARGE-ACTUATED CHROMOGENIC STRUCTURES BASED ON THE OXIDATION AND REDUCTION OF OPTICAL SWITCHABLE MATERIALS IN A THIN-FILM ELECTROCHEMICAL CELL

TECHNICAL FIELD

The present invention relates generally to optical switching, and, more particularly, to improved optical switching speed, and/or electrical power dissipation, relying on reversible (electrochemical) oxidation-reduction reactions.

BACKGROUND ART

Currently, there are a wide variety of known chromogenic materials that can provide optical switching in thin film form. These materials and their applications have been reviewed recently by C. B. Greenberg in *Thin Solid Films*, Vol. 251, pp. 81–93 (1994); R. J. Mortimer in *Chemical Society Reviews*, Vol. 26, pp. 147–156 (1997); and S. A. Agnihotry in *Bulletin of Electrochemistry*. Vol. 12, pp. 707–712 (1996).

Such chromogenic materials are currently being studied for several applications, including active darkening of sunglasses, active darkening of windows for intelligent light and thermal management of buildings, and various types of optical displays (such as heads-up displays on the inside of windshields of automobiles or airplanes and eyeglass displays). Despite their long history of great promise, there are very few photon gating devices made from the existing classes of electrochromic materials. This is because most of them require an oxidation-reduction reaction that involves the transport of ions, such as $H^+$, $Li^+$ or $Na^+$, through some type of liquid or solid electrolyte. Finding the appropriate electrolyte is a major problem, as is the slow speed of any device that requires transport of ions. Furthermore, such reactions are extremely sensitive to background contamination, such as oxygen and other species, and thus degradation of the chromogenic electrodes is a major limitation.

In fact, for photonic switching applications such as a crossbar switch router for a fiber optic communications network, the lack of a suitable chromogenic material has forced companies to use very different approaches: (a) transform the optical signal into an electronic signal, perform the switching operation, and then transform back to an optical signal before launching into a fiber—this is the most frequent solution used today but it is very inefficient and the electronics have a hard time keeping up with the data rates of the optical system; (b) use a moving-mirror array made by micro-electromechanical processing to switch optical data packets—this has the disadvantage that extremely high tolerances are required for the device, which makes it very expensive, and (c) use ink jet technology to push bubbles into a chamber to create a mirror to deflect an optical beam—this approach again requires precision manufacturing and the switching time is slow.

Thus, there remains a need for an optical switch that can rapidly switch optical signals from one path to another with low power dissipation.

DISCLOSURE OF INVENTION

In accordance with the teachings of the embodiments herein, an electrochemically-activated optical switch is provided, comprising a molecular system configured between a pair of electrodes. The molecular system includes a moiety that is oxidizable or reducible in the presence of an electric current induced by an applied voltage of the appropriate magnitude and sign.

A primary advantage of the present invention is simplification (and thus easier manufacturability and lower cost) of the apparatus required for switching.

A second major advantage of the present invention is improved speed of the switching process, since die time scale for switching is determined by the injection or extraction of electrons and holes directly into or from the reductant and oxidant, in a fashion similar to charging or discharging a capacitor, rather than transport of an ion through a thick electrolyte layer.

A third major advantage is that the voltage and the amount of power used to change the color of the structure are quite low, and in fact since the structure is essentially a very thin battery, much of the energy required to store information in the system can be reclaimed later upon erasing or changing the color state of the material.

BRIEF DESCRIPTION OF THE DRAWINGS

FIG. 1 is a schematic representation (perspective, transparent view) of a two color (e.g., black and white) display screen construction for use in accordance with the present invention;

FIG. 1a is a detail for a colorant layer element of the display screen depicted in FIG. 1;

FIG. 2 is a schematic representation (perspective, transparent view) of a full-color display screen construction for use in accordance with the present invention;

FIG. 3 is a schematic representation of a scan addressing embodiment of a two-color display screen construction for use in accordance with the present invention;

BEST MODES FOR CARRYING OUT THE INVENTION

Definitions

Figure 4A:
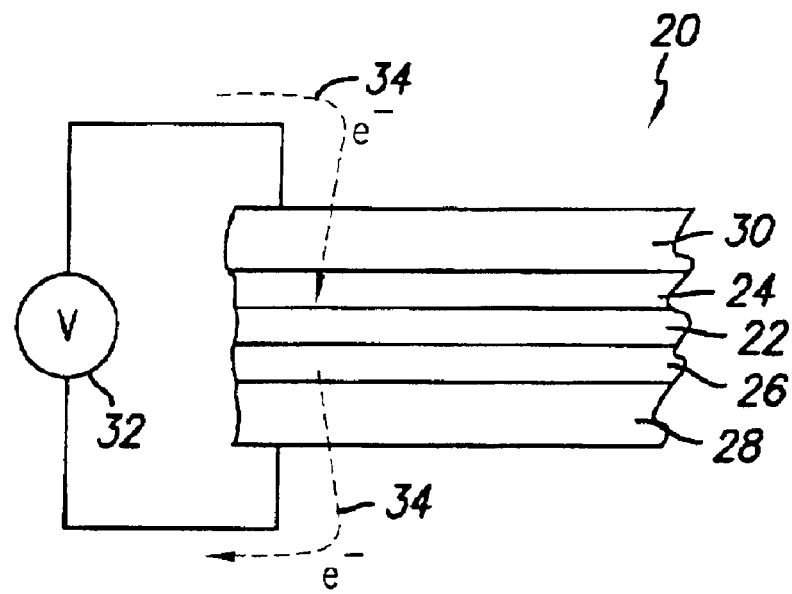
FIG. 4a is a schematic drawing depicting one embodiment of a color-switching device of the present invention in a first state.

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be the basis of a programmable read-only memory (PROM), for example.

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bi-stable" as applied to a molecule means a molecule having two relatively low energy states (local minima) separated by an energy (or activation) barrier. The molecule may be either irreversibly switched from one state to the other (singly configurable) or reversibly switched from one state to the other (reconfigurable). The term "multi-stable" refers to a molecule with more than two such low energy states, or local minima.

The term "micron-scale dimensions" refers to dimensions that range from 1 micrometer to a few micrometers in size.

The term "sub-micron scale dimensions" refers to dimensions that range from 1 micrometer down to 0.05 micrometers.

The term "nanometer scale dimensions" refers to dimensions that range from 0.1 nanometers to 50 nanometers (0.05 micrometers).

Micron-scale and submicron-scale wires refer to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

An optical switch, in the context of the present invention, involves changes in the electromagnetic properties of the molecules, both within and outside that detectable by the human eye, e.g., ranging from the far infra-red (IR) to deep ultraviolet (UV). Optical switching includes changes in properties such as absorption, reflection, refraction, diffraction, and diffuse scattering of electromagnetic radiation.

The term "transparency" is defined within the visible spectrum to mean that optically, light passing through the colorant is not impeded or altered except in the region in which the colorant spectrally absorbs. For example, if the molecular colorant does not absorb in the visible spectrum, then the colorant will appear to have water clear transparency.

The term "omni-ambient illumination viewability" is defined herein as the viewability under any ambient illumination condition to which the eye is responsive.

Optical Switches

Optical switches are described in greater detail in copending U.S. application Ser. No. 10/187720, filed on Jul. 1, 2002, [PD-10005747-1]. Although that application is directed more generally to electric field switchable colorants, the basic teachings of that application also apply to electrochemically switchable colorants. In the former case, a voltage is applied to cause the switching, while in the latter case, a current induced by the application of a voltage of the appropriate magnitude and sign causes the electrochemical oxidation or reduction of species. The embodiments herein are directed to the latter approach.

A generic example taken from the above-referenced application is depicted herein in FIG. 1, wherein a display screen 100 is shown that incorporates at least one colorant layer 101. The colorant layer 101 comprises a pixel array using electrochemically switchable, reconfigurable, dye or pigment molecules of the present invention, described in greater detail below and generically referred to as a "molecular colorant". Each dye or pigment molecule is electrochemically switchable either between an image color (e.g., black) and transparent or between two different colors (e.g., red and green).

Referring briefly to FIG. 1a, the colorant layer 101 is an addressable pixel array formed of bi-stable molecules arrayed such that a selected set of molecules correlates to one pixel. The colorant layer 101 is a thin layer coated on a background substrate 103 having the display's intended background color (e.g., white). The substrate 103 may comprise, for example, a high dielectric pigment (e.g., titania) in a polymer binder that provides good white color and opacity. The stratified combination of colorant layer 101 and substrate 103 thus is fully analogous to a layer of ink on paper. In a blank mode, or erased state, each molecule is switched to its transparent orientation; the "layer of ink" is invisible. The background (e.g., white pixels) shows through in those pixel areas where the colorant layer 101 molecules are switched to the transparent orientation. A transparent view-through layer 105, such as of a clear plastic or glass, is provided superjacent to the colorant-background sandwich to provide appropriate protection. The view-through layer 105 has a transparent electrode array 107 for pixel column or row activation mounted thereto and positioned superjacent to the colorant layer 101. The background substrate 103 has a complementary electrode array 109 for pixel row or column activation mounted thereto (it will be recognized by those skilled in the art that a specific implementation of the stratification of the electrode arrays 107, 109 for matrix addressing and field writing of the individual pixels may vary in accordance with conventional electrical engineering practices). Optionally, the pixels are sandwiched by employing thin film transistor (TFT) driver technology as would be known in the art.

The present display 100 is capable of the same contrast and color as hard copy print. A molecular colorant is ideal because its size and mass are infinitesimally small, allowing resolution and colorant switching times that are limited only by the field writing electrodes and circuitry. Like ink, the colorant layer 101 may develop adequate density in a sub-micron to micron thin layer, potentially lowering the total charge required to switch the colorant between logic states and thus allowing the use of inexpensive drive circuitry.

Suitable reconfigurable bi-stable molecules for use in such displays are disclosed below and claimed herein. In the main, these molecules have optical properties (e.g., color) that are determined by the extent of their $\pi$ orbital electron conjugation. The optical properties, including color or transparency, of the molecules change with oxidation/reduction of the molecules and remain chromatically stable. By disrupting the continuity of conjugation across a molecule, the molecule may be changed from one optical state to another, e.g., colored to transparent. Specific functional groups may be designed into the colorant that can physically cause this disruption by rotating or otherwise distorting certain segments of the dye or pigment molecule relative to other segments, when the molecule is oxidized or reduced.

The colorant layer 101 is a homogeneous layer of molecules which are preferably colored (e.g., black, cyan, magenta, or yellow) in a more-conjugated orientation and transparent in a less-conjugated orientation. By making the abutting background substrate 103 white, the colorant layer 101 may thereby produce high contrast black and white, and colored images. The colorant layer 101 may comprise a single electrochemically switchable dye or pigment or may comprise a mixture of different electrochemically switchable dyes or pigments that collectively produce a composite color (e.g., black). By using a molecular colorant, the resolution of the produced image is limited only by the electric field resolution produced by the electrode array 107, 109. The molecular colorant additionally has virtually instantaneous switching speed, beneficial to the needs of fast scanning (as described with respect to FIG. 3 hereinafter). In certain cases, the molecular colorant may be contained in a polymeric layer. Polymers for producing such coatings are well-known, and include, for example, acrylates, urethanes, and the like. Alternatively, the colorant layer 101 may be self-assembled.

In one embodiment, the colorant layer 101 is offered as a substitute for matrix-addressed liquid crystal flat panel displays. As is well-known for such displays, each pixel is addressed through rows and columns of fixed-position electrode arrays, e.g., 107, 109. The fixed-position electrode arrays 107, 109 consist of conventional crossbar electrodes 111, 113 that sandwich the colorant layer 101 to form an overlapping grid (matrix) of pixels, each pixel being addressed at the point of electrode overlap. The crossbar electrodes 111, 113 comprise parallel, spaced electrode lines arranged in electrode rows and columns, where the row and column electrodes are separated on opposing sides of the colorant layer 101. Preferably, a first set of transparent crossbar electrodes 107 (201, 203 in FIG. 2 described in detail hereinafter) is formed by thin film deposition of indium tin oxide (ITO) on a transparent substrate (e.g., glass). These row addressable pixel crossbar electrodes 107 are formed in the ITO layer using conventional thin film patterning and etching techniques. The colorant layer 101 and background substrate 103 are sequentially coated over or mounted to the transparent electrode layer, using conventional thin film techniques (e.g., vapor deposition) or thick film techniques (e.g., silkscreen, spin cast, or the like). Additional coating techniques include Langmuir-Blodgett deposition and self-assembled monolayers. Column addressable pixel crossbar electrodes 109 (202, 204 in FIG. 2) are preferably constructed in like manner to the row electrodes 107. The column addressable pixel crossbar electrodes 109 may optionally be constructed on a separate substrate that is subsequently adhered to the white coating using conventional techniques.

This display 100, 200 provides print-on-paper-like contrast, color, viewing angle, and omni-ambient illumination viewability by elimination of the polarization layers required for known liquid crystal colorants. Using the described-display also allows a significant reduction in power drain. Whereas liquid crystals require a holding field even for a static image, the present molecules of the colorant layer 101 can be modal in the absence of a current when bi-stable molecules are used. Thus, the present bi-stable colorant layer 101 only requires an applied voltage when a pixel is changed (the oxidation or reduction process) and only for that pixel. The power and image quality improvements will provide significant benefit in battery life and display readability, under a wider range of viewing and illumination conditions for appliances (e.g., wristwatches, calculators, cell phones, or other mobile electronic applications) television monitors and computer displays. Furthermore, the colorant layer may comprise a mosaic of colored pixels using an array of bi-stable color molecules of various colors for lower resolution color displays.

Since each colorant molecule in colorant layer 101 is transparent outside of the colorant absorption band, then multiple colorant layers may be superimposed and separately addressed to produce higher resolution color displays than currently available. FIG. 2 is a schematic illustration of this second embodiment. A high resolution, full color, matrix addressable, display screen 200 comprises alternating layers of transparent electrodes—row electrodes 201, 203 and column electrodes 202 and 204—and a plurality of colorant layers 205, 207, 209, each having a different color molecule array. Since each pixel in each colorant layer may be colored or transparent, the color of a given pixel may be made from any one or a combination of the color layers (e.g., cyan, magenta, yellow, black) at the fall address resolution of the display. When all colorant layers 205, 207, 209 for a pixel are made transparent, then the pixel shows the background substrate 103 (e.g., white). Such a display offers the benefit of three or more times resolution over present matrix LCD devices having the same pixel density but that rely on single layer mosaic color. Details of the fabrication of the display are set forth in the above-mentioned co-pending application.

The color to be set for each pixel is addressed by applying a voltage across the electrodes directly adjacent to the selected color layer. For example, assuming yellow is the uppermost colorant layer 205, magenta is the next colorant layer 207, and cyan is the third colorant layer 209, then pixels in the yellow layer are addressed through row electrodes 201 and column electrodes 202, magenta through column electrodes 202 and row electrodes 203, and cyan through row electrodes 203 and column electrodes 204. This simple common electrode addressing scheme is made possible because each colorant molecule is color stable in the absence of an applied voltage.

FIG. 3 depicts a third embodiment, which employs scan-addressing rather than matrix-addressing. Matrix address displays are presently limited in resolution by the number of address lines and spaces that may be patterned over the relatively large two-dimensional surface of a display, each line connecting pixel row or column to the outer edge of the display area. In this third embodiment, the bi-stable molecular colorant layer 101 and background substrate 103 layer construction is combined with a scanning electrode array printhead to provide a scanning electrode display apparatus 300 having the same readability benefits as the first two embodiments described above, with the addition of commercial publishing resolution. Scanning electrode arrays and drive electronics are common to electrostatic printers and their constructions and interfaces are well-known. Basically, remembering that the bi-stable molecular switch does not require a holding voltage, the scanning electrode array display apparatus 300 changes a displayed image by printing a pixel row at a time. The scanning electrode array display apparatus 300 thus provides far greater resolution by virtue of the ability to alternate odd and even electrode address lines along opposing sides of the array, to include multiple address layers with pass-through array connections and to stagger multiple arrays that proportionately superimpose during a scan. The colorant layer 101 may again be patterned with a color mosaic to produce an exceptionally high resolution scanning color display.

More specifically, the third embodiment as shown in FIG. 3 comprises a display screen 302, a scanned electrode array 304, and array translation mechanism 301 to accurately move the electrode array across the surface of the screen. The display screen 302 again comprises a background substrate 103, a transparent view-through layer 105, and at least one bi-stable molecule colorant layer 101. The colorant layer 101 may include a homogeneous monochrome colorant (e.g., black) or color mosaic, as described herein above. The scanned electrode array 304 comprises a linear array or equivalent staggered array of electrodes in contact or near contact with the background substrate 103. A staggered array of electrodes may be used, for example, to minimize field crosstalk between otherwise adjacent electrodes and to increase display resolution.

In operation, each electrode is sized, positioned, and electrically addressed to provide an appropriate current, represented by the arrow labeled "I", across the colorant layer 101 at a given pixel location along a pixel column. The current I is oriented perpendicular to the plane of the colorant layer 101 by placing a common electrode (e.g., an ITO layer) on the opposing coating side to the electrode array. The amount of charge that flows through the pixel, and thus the number of molecules that is oxidized or reduced and thus the optical density of the pixel, is determined by the amount of time the electrode spends at the pixel location. Additional information regarding alternate embodiments and scanning mechanisms are discussed in the above-mentioned co-pending application.

Present Embodiments

In accordance with the embodiments disclosed herein, a thin-film electrochemical cell is made into an optical switch that can alternate among various color states by charging or discharging the electrochemical cell to various potentials. This mechanism is completely different from any previously described electrochromic or chromogenic material. The general idea is to create a thin film structure that contains (a) a layer of a material that can easily be oxidized, (b) an intermediate solid or highly viscous electrolyte, and (c) a layer of a material with a substituted tetrazole that can be easily reduced. In the process of the oxidation or reduction, either or both materials (a) and (c) should undergo a strong color change. This three-layer system is sandwiched between two electrodes, at least one of which may be any type of transparent conductor. Under the influence of an applied electric potential, electrons are removed from the easily oxidized material and transferred through external circuitry to the material that can be reduced. Since one of these materials undergoes a color change, the result is a switch in the color state of the device.

However, both the oxidized and reduced materials can be reconverted back to their original redox state (or color states) by applying a reversed electric potential (which is in some cases achieved simply by shorting the electrodes).

Substituted tetrazoles are preferably employed in the practice of the embodiments disclosed herein. Tetrazole itself is represented by the formula

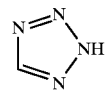

while substituted tetrazoles are represented by the formula

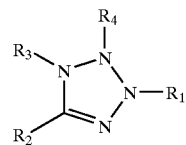

Where $R_1$, $R_2$, $R_3$, and $R_4$ are independently H, alkyls, or aryls. Preferably, two of the substituents can be alkyls and/or aryls, and the rest hydrogen. Examples of suitable aryls include phenyl, naphthyl, and anthracyl. Further, the ring carbon may be in the 3-position, as shown above, or in the 2-position.

One molecular example for this model, employing oxidation/reduction via current flow, is illustrated as follows:

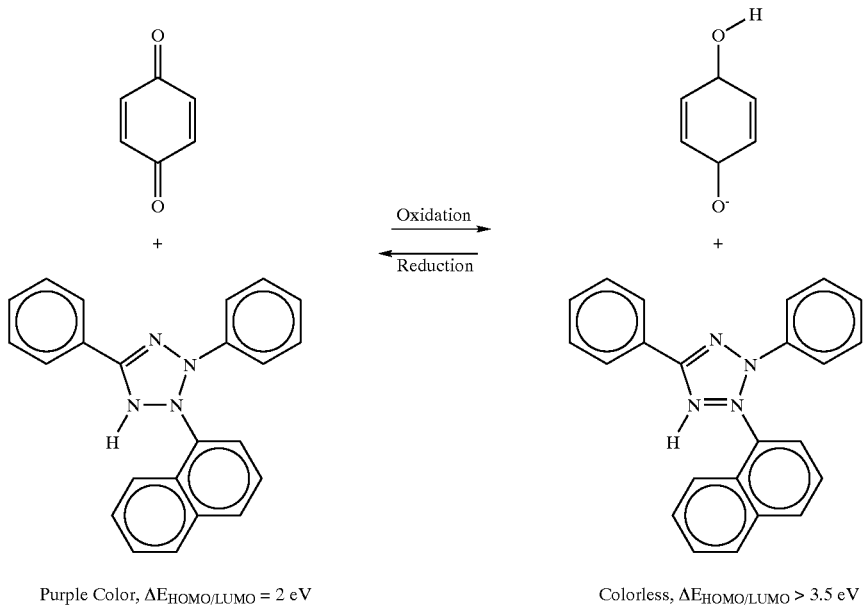

Purple Color, $\Delta E_{HOMO/LUMO} = 2$ eV

Colorless, $\Delta E_{HOMO/LUMO} > 3.5$ eV

The foregoing molecular system is bi-stable, being electrochemically switchable between a purple color and colorless. The following molecular system is tri-stable, being electrochemically switchable between blue, magenta, and colorless.

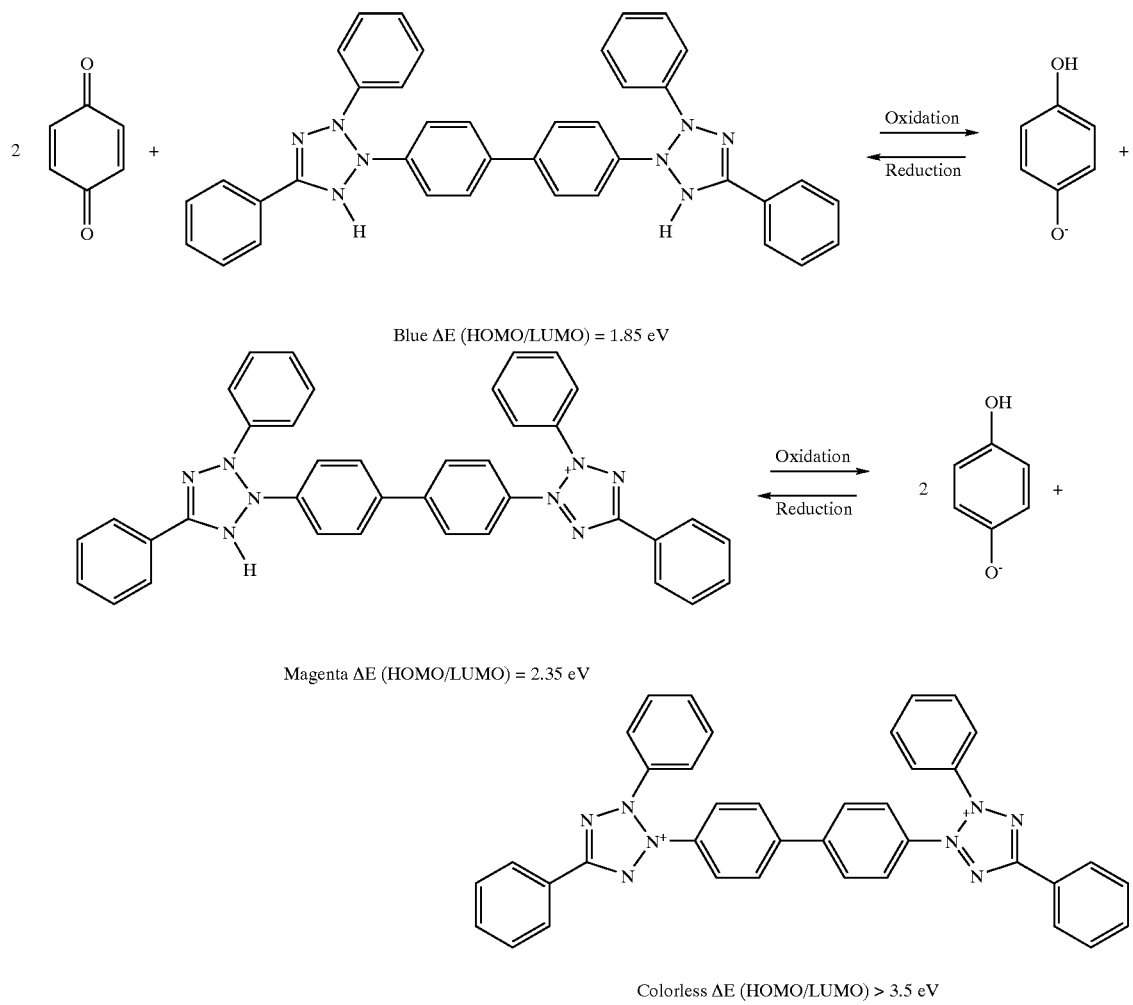

Blue ΔE (HOMO/LUMO) = 1.85 eV

Magenta ΔE (HOMO/LUMO) = 2.35 eV

Colorless ΔE (HOMO/LUMO) > 3.5 eV

The HOMO-LUMO (Highest Occupied Molecular Orbital—Lowest Unoccupied Molecular Orbital) gap of the chromogenic materials can be tuned by substituting various chemical groups onto the molecules. Thus, the molecules are switchable between two (or more) colors or from one color to a transparent state, and at the same time the transmissivity and/or reflectivity of the multi-layer system (electrodes plus molecular layers) switches between two desirable states.

Figure 4B:
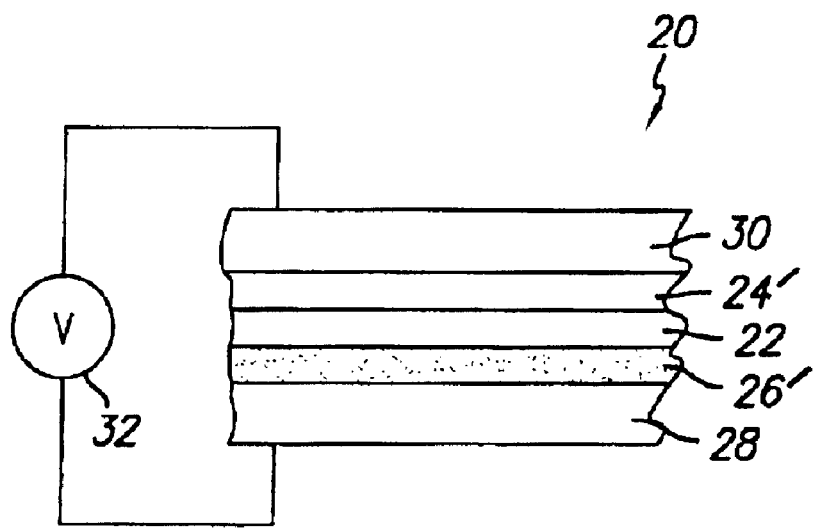
FIG. 4b is a drawing similar to that of FIG. 4a, but in a second, or switched, state.

FIGS. 4a–4b depict one embodiment of the color-switching device of the present invention. The device 20 comprises three layers 22, 24, 26 sandwiched between two electrodes 28, 30. Layer 22 is an electrolyte, sandwiched between reductant layer 24 and oxidant layer 26.

For the layers 22, 24, 26 shown in FIGS. 4a–4b, sufficiently thick molecular films are grown, for example using Langmuir-Blodgett techniques, vapor phase deposition, or electrochemical deposition, such that appropriate thicknesses of each layer have been deposited. Another deposition technique is to suspend the molecules as a monomer/oligomer or solvent-based solution that is thick film coated (e.g., reverse roll) or even spin-coated onto the substrate. At least one of the two electrodes 28, 30 should be a transparent conductor, such as indium-tin oxide.

The cell 20 is operated as a thin-film rechargeable battery, with an external potential 32 applied to drive the half reactions of the two active layers 24, 26 in the desired direction. The electrolyte layer 22 can be one of the advanced electrolytes currently used in battery technology. In this case, it is not the diffusion of ions into a material that controls the speed and intensity of a color change, but rather the flow of electrons e along path 34, and the ion conductivity through the solid electrolyte 22 simply acts to maintain charge neutrality. When the reverse color change is desired, the two electrodes 28, 30 may be shorted to one another to discharge the battery 20. This current may be harnessed to provide useful work in some other part of the system, thus leading to a more energy efficient color-switching system.

FIGS. 4a and 4b are before and after representations of a process in which layer 24 is reduced, as represented by layer 24' in FIG. 4b, and layer 26 is oxidized, as represented by layer 26' in FIG. 4b. FIG. 4a also shows the direction of flow of electrons 34 in the cell 20 to carry out the switching (this may be accomplished by attaching an external drive voltage, or in the case of a "charged battery", simply shorting the electrodes 28, 30 together. In this example, both the layers 24, 26 are transparent before the oxidation/reduction process (FIG. 4a). After the current flows through the cell 20, at least some of layer 24 is reduced and at least some of layer 26 is oxidized. In this example, the material in layer 26 was designed to change color, as shown by the stippling of layer 26' in FIG. 4b.

The cell 20 is a magnified version of a single pixel in FIGS. 1–3. In other words, the upper electrode 30 is a portion of one of the crossed wires or ribbons 107, and the bottom electrode 28 is the perpendicular crossed wire 109 for a particular pixel.

INDUSTRIAL APPLICABILITY

The molecular structures disclosed herein are expected to find use in optical switch and display applications.

What is claimed is:

1. An electrochemically-activated optical switch comprising a molecular system configured between a pair of electrodes, said molecular system including at least one organic non-polymeric molecule that changes color when oxidized or reduced by an electric current.

2. The optical switch of claim 1 wherein said organic non-polymeric molecule comprises a substituted tetrazole.

3. The optical switch of claim 2 wherein said substituted tetrazole is represented by the formula

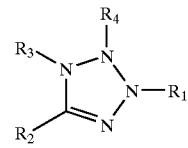

where $R_1$, $R_2$, $R_3$, and $R_4$ are independently H, alkyls, or aryls and the ring carbon is in the 3-position.

4. The optical switch of claim 3 wherein any two of $R_1$, $R_2$, $R_3$, and $R_4$ are alkyls and/or aryls, and the remainder hydrogen.

5. The optical switch of claim 3 wherein the ring carbon is in the 2-position.

6. The optical switch of claim 3 wherein said molecular system comprises:

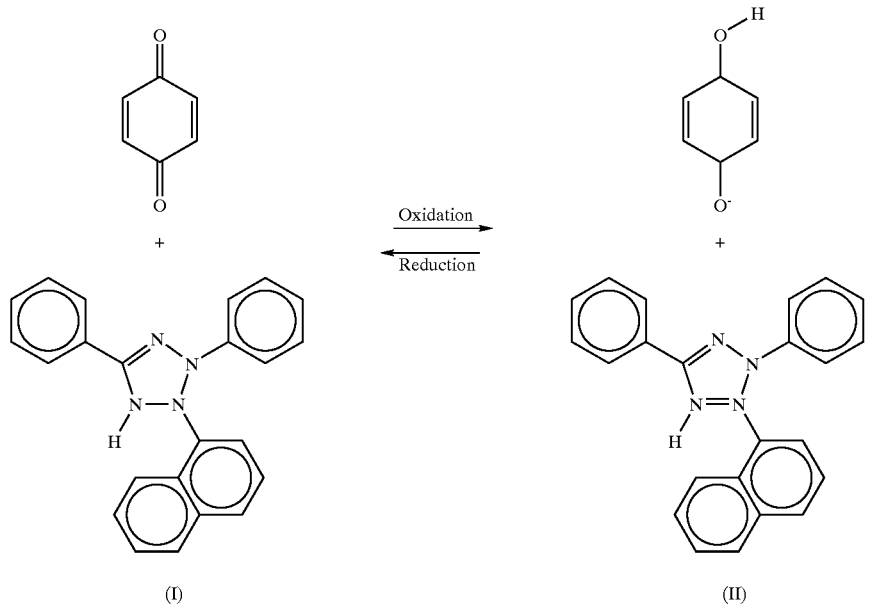

wherein (I) is purple and has a $\Delta E_{HOMO/LUMO}=2$ eV and wherein (II) is colorless and has a $\Delta E_{HOMO/LUMO}>3.5$ eV.

7. The optical switch of claim 3 wherein said molecular system comprises:

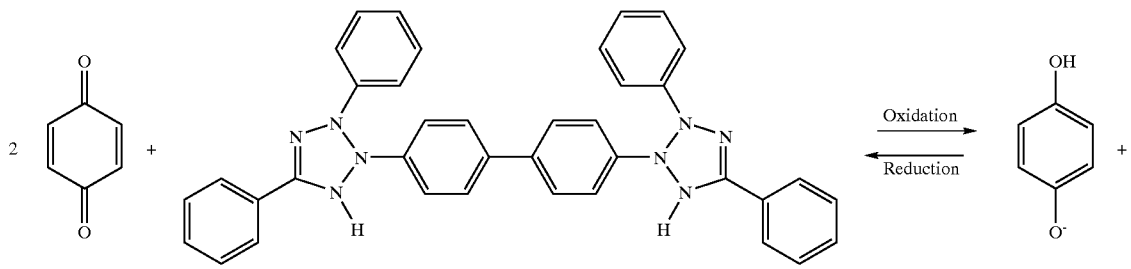

Blue $\Delta E$ (HOMO/LUMO) = 1.85 eV

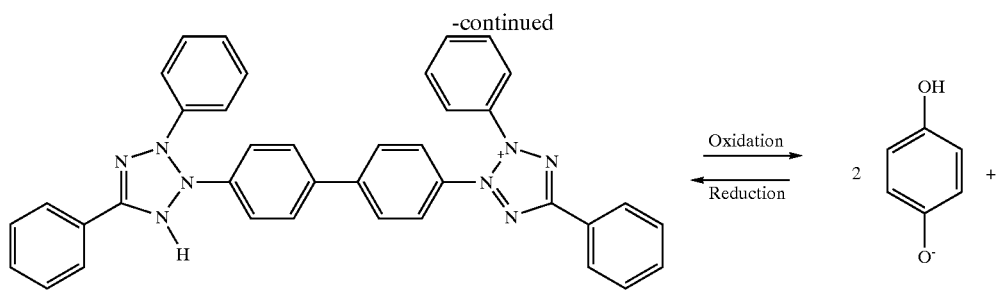
Magenta ΔE (HOMO/LUMO) = 2.35 eV
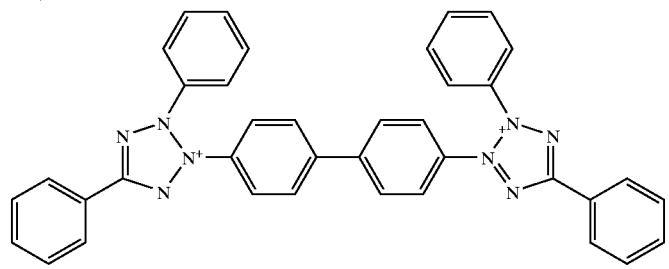
Colorless ΔE (HOMO/LUMO) > 3.5 eV
wherein (III) is blue and as a $\Delta E_{HOMO/LUMO}$=1.85 eV, wherein (IV) is magenta and has a $\Delta E_{HOMO/LUMO}$=2.35 eV, and wherein (V) is colorless and has a $\Delta E_{HOMO/LUMO}$>3.5 eV.
* * * * *